US011215071B2

(12) United States Patent
Giljohann et al.

(10) Patent No.: US 11,215,071 B2
(45) Date of Patent: Jan. 4, 2022

(54) METHOD AND DEVICE FOR CLEANING A JET ENGINE

(71) Applicant: Lufthansa Technik AG, Hamburg (DE)

(72) Inventors: Sebastian Giljohann, Wiesbaden (DE);
Holger Stefan Appel, Offenbach (DE);
Dirk Deja, Nauheim (DE)

(73) Assignee: LUFTHANSA TECHNIK AG,
Hamburg (DE)

( * ) Notice: Subject to any disclaimer, the term of this patent is extended or adjusted under 35 U.S.C. 154(b) by 570 days.

(21) Appl. No.: 15/577,782

(22) PCT Filed: May 26, 2016

(86) PCT No.: PCT/EP2016/061890
§ 371 (c)(1),
(2) Date: Nov. 29, 2017

(87) PCT Pub. No.: WO2016/193112
PCT Pub. Date: Dec. 8, 2016

(65) Prior Publication Data
US 2018/0306055 A1 Oct. 25, 2018

(30) Foreign Application Priority Data
May 29, 2015 (DE) .................. 10 2015 209 994.6

(51) Int. Cl.
B24B 1/00 (2006.01)
F01D 25/00 (2006.01)
(Continued)

(52) U.S. Cl.
CPC .......... F01D 25/002 (2013.01); B08B 7/0092 (2013.01); B24C 1/003 (2013.01);
(Continued)

(58) Field of Classification Search
CPC . B08B 9/032; B08B 9/0321; B08B 2209/032; B24C 1/003; B24C 3/325;
(Continued)

(56) References Cited

U.S. PATENT DOCUMENTS 3,033,711 A  5/1962 Harding
4,065,322 A * 12/1977 Langford ................ B24C 1/003
                                                    134/7
(Continued)

FOREIGN PATENT DOCUMENTS

CN  104438229 A  3/2015
DE  10163852 A   7/2003
(Continued)

OTHER PUBLICATIONS

"5-2 Carbon Dioxide Blasting Operations", Carbon Dioxide Blasting Operations, Joint Service Pollution Prevention Opportunity Handbook, Aug. 2001, pp. 1-6.

Primary Examiner — Joseph J Hail
Assistant Examiner — Shantese L McDonald
(74) Attorney, Agent, or Firm — Leydig, Voit & Mayer Ltd.

(57) ABSTRACT

A method for cleaning a jet engine includes introducing a cleaning medium having solid materials into the engine by way of at least one discharging device, wherein the cleaning medium exits from the discharging device at an exit speed of 80 m/s or less.

22 Claims, 1 Drawing Sheet

(51) Int. Cl.
*B24C 1/00* (2006.01)
*B24C 3/32* (2006.01)
*B08B 7/00* (2006.01)
*B24C 7/00* (2006.01)
*B24C 5/08* (2006.01)
*B64F 5/30* (2017.01)
*B08B 9/032* (2006.01)

(52) U.S. Cl.
CPC .............. *B24C 3/327* (2013.01); *B24C 5/08* (2013.01); *B24C 7/0046* (2013.01); *B24C 7/0053* (2013.01); *B24C 7/0092* (2013.01); *B08B 9/032* (2013.01); *B08B 2209/032* (2013.01); *B64F 5/30* (2017.01)

(58) Field of Classification Search
CPC .. B24C 3/327; B24C 5/02; B24C 5/04; B24C 7/0046; B24C 7/0053; B24C 7/0061; B24C 7/0092; B64F 5/30
USPC .......................... 451/38, 39, 53, 75, 87, 103
See application file for complete search history.

(56) References Cited

U.S. PATENT DOCUMENTS

| | | | | |
|---|---|---|---|---|
| 4,655,847 A * | 4/1987 | Ichinoseki | ............ | B24C 7/0092 134/7 |
| 5,203,794 A * | 4/1993 | Stratford | ................. | B24C 1/003 451/39 |
| 5,445,553 A * | 8/1995 | Cryer | ..................... | B24C 1/003 451/39 |
| 6,688,946 B2 * | 2/2004 | Schmidt | ..................... | B24C 3/30 210/252 |
| 7,347,768 B1 * | 3/2008 | Drew | ................... | B24C 7/0046 451/120 |
| 8,109,807 B2 * | 2/2012 | Giljohann | ................. | B08B 3/02 451/11 |
| 8,197,609 B2 * | 6/2012 | Alvestig | ................... | B08B 3/02 134/104.4 |
| 8,246,753 B2 * | 8/2012 | Tadayon | ................. | B08B 15/02 134/10 |
| 9,206,703 B2 * | 12/2015 | Tadayon | ............... | F01D 25/002 |
| 9,452,848 B2 * | 9/2016 | McDermott | .......... | F01D 25/002 |
| 9,903,223 B2 * | 2/2018 | Appel | ..................... | B24C 1/003 |
| 2003/0207655 A1 | 11/2003 | Jackson | | |
| 2008/0092923 A1 | 4/2008 | Elbing et al. | | |
| 2010/0000572 A1 * | 1/2010 | Giljohann | ................. | B08B 3/02 134/7 |
| 2010/0075579 A1 | 3/2010 | Knisel et al. | | |
| 2017/0191376 A1 * | 7/2017 | Eriksen | ................... | B24C 3/327 |
| 2017/0361418 A1 * | 12/2017 | Twelves | ................ | B22F 3/1055 |

FOREIGN PATENT DOCUMENTS

| | | |
|---|---|---|
| DE | 10243693 B3 | 4/2004 |
| DE | 102005005638 B3 | 2/2006 |
| DE | 102006047742 A1 | 10/2007 |
| DE | 102007014284 B4 | 2/2009 |
| DE | 102008036331 B3 | 11/2009 |
| DE | 102013107400 A1 | 1/2015 |
| EP | 0370762 A1 | 5/1990 |
| JP | S 6052800 A | 3/1985 |
| JP | H 04360766 A | 12/1992 |
| JP | 2000042505 A | 2/2000 |
| JP | 2011218323 A | 11/2011 |
| WO | WO 2005120953 A1 | 12/2005 |
| WO | WO 2008113497 A1 | 9/2008 |
| WO | WO 2009132847 A1 | 11/2009 |
| WO | WO 2012123098 A1 | 9/2012 |
| WO | WO 2015074765 A1 | 5/2015 |
| WO | WO 2015074766 A1 | 5/2015 |

* cited by examiner

METHOD AND DEVICE FOR CLEANING A JET ENGINE

CROSS REFERENCE TO RELATED APPLICATIONS

This application is a U.S. National Stage Application under 35 U.S.C. § 371 of International Application No. PCT/EP2016/061890 filed on May 26, 2016, and claims benefit to German Patent Application No. DE 10 2015 209 994.6 filed on May 29, 2015. The International Application was published in German on Dec. 8, 2016 as WO 2016/193112 A1 under PCT Article 21(2).

FIELD

The invention relates to a method and an apparatus for cleaning an aircraft jet engine, and more specifically, to a method and an apparatus for cleaning an aircraft jet engine with a cleaning medium that includes solid materials that can be, e.g., introduced into the engine by way of at least one discharging device.

BACKGROUND

Aircraft jet engines have one or more compressor stages, a combustion chamber, and one or more turbine stages. In the turbine stages, the hot combustion gases which come from the combustion chamber relinquish part of their thermal and mechanical energy which is utilized to drive the compressor stages. Jet engines of commercial passenger aircraft nowadays predominantly have what is known as a turbofan which is arranged upstream of the compressor stages and as a rule has a considerably greater diameter than the compressor stages. The turbofan is likewise driven by way of the turbine stages and allows a considerable part of the air which flows through the engine overall to flow past the compressor stages, the combustion chamber and the turbine stages as what is known as an auxiliary air flow. The degree of efficiency of an engine can be increased considerably by way of an auxiliary flow of this type and, moreover, improved noise damping of the engine can be ensured.

A contamination of an aircraft jet engine can lead to a reduction in the degree of efficiency, which results in an increased fuel consumption and therefore increased environmental pollution. The contamination can be brought about, for example, by way of insects, dust, salt spray or other environmental pollutants. Parts of the engine can be contaminated by way of combustion residues of the combustion chamber. Said contaminations form a layer on those parts of an aircraft engine, through which air flows, and impair the surface quality. The thermodynamic degree of efficiency of the engine is impaired in this way. The blades in the compressor stages are to be mentioned here, in particular, the contamination of which has a considerable influence on the degree of efficiency of the overall engine.

In order to eliminate contaminants, it is known to clean an engine with a cleaning liquid, as a rule hot water. WO 2005/120953 has disclosed an arrangement, in which a plurality of cleaning nozzles are arranged upstream of the turbofan and/or the compressor stages. The cleaning liquid is then sprayed into the engine. Here, the engine can be rotated using what is known as dry cranking, that is to say the blades of the engine rotate without kerosene being burned in the combustion chamber. Contaminants are to be washed from the surfaces of the engine components by way of the cleaning liquid which is introduced into the engine.

As an alternative to the use of water as a cleaning medium, the use of coal dust is known. Here, the coal dust is introduced into the engine through nozzles, just like the water, and removes contaminants from surfaces on account of abrasive effects. The surface of the engine parts is also attacked by the coal dust, however, for which reason a cleaning medium such as coal dust is not suitable for the regular cleaning of aircraft engines. Moreover, undesired residues of the cleaning material remain in the engine during cleaning with coal dust.

WO 2009/132847 A1 discloses an apparatus and a method for cleaning jet engines using solid carbon dioxide as cleaning medium.

SUMMARY

In an embodiment, the present invention provides a method for cleaning a jet engine. The method includes introducing a cleaning medium having solid materials into the engine by way of at least one discharging device, wherein the cleaning medium exits from the discharging device at an exit speed of 80 m/s or less.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
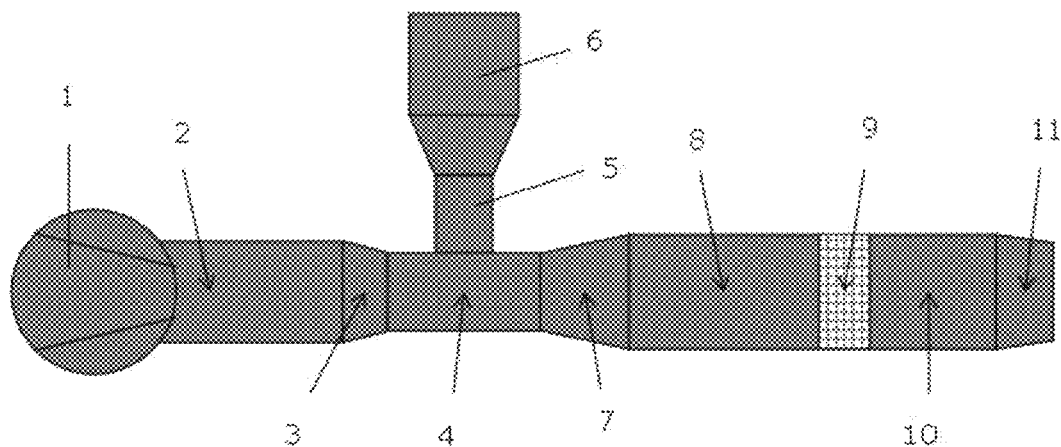
FIG. 1 diagrammatically shows a cleaning apparatus according to an embodiment of the invention.

Embodiments of the present invention provide for improved cleaning of aircraft engines.

A method according to an embodiment of the invention provides for cleaning a jet engine with a cleaning medium which comprises solid materials. The solid materials are introduced into the engine by means of at least one discharging device. The solid materials can be solid materials which are stable at the use temperature, such as plastic beads, glass beads, sand or coal dust. Thermolabile solid materials are preferably used, however, such as solid carbon dioxide and/or ice (water ice). One or more discharging devices can be used within the context of the invention; in the following text, the use of a singular discharging device is intended to include the use of plural discharging devices.

According to an embodiment, the cleaning medium exits from the discharging device at an exit speed of 80 m/s or less. The exit speed can be, in various embodiments, from 5 to 50 m/s, preferably from 10 to 30 m/s.

According to embodiments of the invention, the cleaning medium is released from a discharging device (preferably at a negative pressure or at most below a slight positive pressure of at most 1 bar) in the region of the engine inlet and is thus output with an at most small basic impulse at a maximum speed of 80 m/s into the air flow in front of the engine, and is conveyed through the engine by way of said air flow.

According to embodiments of the invention, the discharging device can be any device which makes the desired release under the stated conditions (preferably negative pressure or at most with a low positive pressure) possible. A discharging device can have, for example, an opening, the cross section of which is widened, not constricted or slightly constricted in comparison with the cross section of the feeding hose or pipe system. Within the context of the invention, slightly constricted is a reduction in the diameter of the opening of 50% or less. This is preferably intended to avoid a situation where an excessively high flow speed and therefore an undesirably high impulse of the exiting cleaning medium are produced by way of an excessively great constriction in the region of the exit opening of the discharging device.

A discharging device can have one or more exit openings according to the invention, which exit openings can be arranged either statically or in a corotating manner in front of the inlet of the engine.

Effective cleaning, in particular, of the compressor of an engine, can be made possible by way of methods according to embodiments of the invention. According to embodiments of the invention, the cleaning medium follows the flow in the compressor and achieves a cleaning effect in all stages of the compressor, in particular also in the rearmost stages. It is achieved according to embodiments of the invention, in particular, that thermolabile solid materials such as, in particular, carbon dioxide or ice do not already output all the kinetic energy in the front stages of the compressor and/or are not exploded/comminuted, sublimate or melt on components during the impact on account of an excessively high kinetic energy. Instead, the solid materials are merely given a basic impulse by way of the parameters according to the invention, which impulse conveys them into the engine. The relative speed to the air flow which flows through the engine is preferably low according to the invention. Relatively long contact times with the engine components, in particular compressor components, are produced as a result, which contact times bring about an improved cleaning effect. The solid material is entrained by the gas flow in the engine and is thus also conveyed into the rearmost compressor stages.

The combination of method parameters according to embodiments of the invention permits effective cleaning of the compressor (core engine) of jet engines over their entire length, in particular even in the rear stages in the flow direction.

In one possible variant of the invention, the cleaning medium (the solid material) is conveyed mechanically to the discharging device. Mechanical conveying means a direct contact with suitable mechanical conveying devices; worm conveyors or spiral conveyors are to be mentioned by way of example.

The cleaning medium can preferably be conveyed pneumatically to the discharging device. Pneumatic conveying comprises the use of a carrier gas, preferably air, for example the use of a fan. In the case of pneumatic conveying, operation is carried out at a pressure of less than 1 bar or vacuum, which pressure is at most increased slightly in comparison with ambient pressure. This is intended to avoid a situation where the cleaning medium exits from the discharging device with an excessively high impulse or at an excessively high speed which lies considerably above the flow speed of the air which flows into the inlet of the engine. The relative speed of the cleaning medium in comparison with said air flow in the engine inlet is therefore to be as low as possible or equal to zero. In various embodiments, the pressure can be from 0.5 to 2 bar, more preferably from 0.7 to 2 bar, more preferably from 0.9 to 2 bar.

In order to make the desired entraining of the solid materials by way of the air flow in the compressor possible, without the solid materials coming prematurely into contact with the inner or outer compressor wall, the exit direction of the discharging device (within the context of the invention, this term denotes the main exit direction) should reach as far as possible into the compressor without said exit direction or its imaginary axis coming into contact with the walls of the compressor. For this purpose, it is provided, according to embodiments of the invention, that the exit opening of the conveying unit is arranged at a radial spacing from the rotational axis of the engine, which radial spacing corresponds to from 0.5 to 1.2 times, preferably from 0.6 to 1 times the radius of the inlet opening, which is directed upstream, of the first compressor stage. The outlet therefore lies closer in the radial direction to the outer compressor wall than to the rotational axis of the engine or compressor.

The main exit direction of the discharging device is preferably oriented horizontally (parallel to the rotational axis of the engine) into the engine inlet. As an alternative, the exit direction can enclose an angle with the rotational axis of the engine, which angle corresponds substantially to the angle of attack of the fan blades of the engine. This facilitates the passage of the cleaning medium through the fan and the entry into the core engine which is arranged behind the latter.

According to embodiments of the invention, the solid material particles (for example, pellets) can have different sizes. This can be either a broad size distribution or else a size distribution with two or more different maxima which can be obtained, for example, by mixing two or more batches of particles of different size or size distribution together. One or more storage containers with solid material particles of different size can be used; as an alternative, a comminution of at least part of the solid material particles can take place during the course of a method according to the invention before the exit from the discharging device.

According to embodiments of the invention, the solid materials are preferably selected from the group consisting of solid carbon dioxide and water ice. Solid carbon dioxide is particularly preferred. Carbon dioxide and/or water ice can particularly preferably be used in the form of pellets. The use of water ice as comminuted ice (what is known as crushed ice) is likewise possible.

Pellets can be produced from liquid $CO_2$ in what is known as a pelletizer and are satisfactorily storable. It can be provided that a supply device conveys prefabricated pellets to the discharging device. It is also possible, however, that the supply device has an apparatus, in order to produce solid carbon dioxide pellets or solid carbon dioxide snow from liquid carbon dioxide, and conveys the latter to the discharging device. In both cases, the solid carbon dioxide exits and passes into the engine to be cleaned.

The "Carbon Dioxide Blasting Operations" document from the US military describes the technique for producing $CO_2$ pellets. Pellets are obtained, for example, by way of a compression of solid $CO_2$ (for example, flakes) in a pelletizer or the like. The production of ice pellets (water ice) is familiar to a person skilled in the art and does not require more detailed explanation here. The use of $CO_2$ pellets at the low exit speed which is provided according to the invention makes a passage and a satisfactory cleaning effect over the entire axial length of the core engine possible despite the transitory nature of said $CO_2$ pellets.

In one variant of a method according to an embodiment of the invention, the cleaning medium can have solid carbon dioxide and water ice in the mass ratio of from 5:1 to 1:5, preferably of from 1:2 to 2:1. The advantages of the two cleaning media are combined in this way. Although it is fundamentally already known (WO 2012/123098 A1) to provide a mixture of pellets comprising carbon dioxide and ice as a solid abrasive for cleaning surfaces, it has been shown that said mixture can be used particularly advantageously for cleaning jet engines, since the majority of the solid carbon dioxide already sublimates in the front region of the compressor and cleans said region firstly by way of the kinetic energy of the collision and by way of thermal effects. Contaminants are detached from the surfaces of the engine parts on account of the hot/cold stress which is induced by way of the carbon dioxide. The ice which is added to the mixture according to the invention has a higher hardness and longer durability than solid carbon dioxide. As a result, it firstly improves the mechanical cleaning effect by way of the kinetic energy of the impact, and is more capable of penetrating the compressor overall as far as the rear stages and of also still having a cleaning effect there. The mixture which is used according to the invention firstly brings about largely complete and homogeneous cleaning of all stages of the compressor, and secondly introduces only comparatively small quantities of water into the engine. Said introduced water is for the greatest part transported out of the engine by way of the air flow which flows through the engine during dry cranking.

The mean size of the pellets which are used preferably lies in the range of from 0.5 to 10 mm; it can preferably be approximately from 1.5 to 6 mm. If elongate pellets are used, their length can be, for example, from 2 to 6 mm; the dimension transversely with respect to the longitudinal extent is, for example, approximately 3 mm. One possible embodiment for achieving different pellet sizes during the cleaning is the use of a scrambler, by way of which the pellets are comminuted during conveying. A further embodiment can be the direct addition of different pellet sizes into the storage container.

The solid materials are preferably introduced with a mass flow of from 500 to 2500 kg/h, more preferably of from 1000 to 2500 kg/h, more preferably of from 1200 to 2000 kg/h, more preferably of from 1500 to 2000 kg/h.

The duration of the cleaning operation (pure blasting time without interruptions) can be from 1 to 15 minutes, preferably from 2 to 10 minutes, more preferably from 4 to 7 minutes.

During a cleaning operation, for example, from 10 to 600 kg, preferably from 35 to 400 kg, more preferably from 40 to 250 kg of solid material can be introduced into the engine.

The dry cranking or turning of the jet engine during the cleaning operation preferably takes place at a fan rotational speed of from 50 to 500 $min^{-1}$, preferably of from 100 to 300 $min^{-1}$, more preferably of from 120 to 250 $min^{-1}$. A fan rotational speed of between 150 and 250 $min^{-1}$ is particularly preferred. The cleaning can also take place during idling operation of the engine. The rotational speed is then preferably from 500 to 1500 $min^{-1}$.

An apparatus according to an embodiment of the invention is configured for carrying out a method according to an embodiment of the invention and has the following features: a) a device for generating a gas flow, b) a mixing device for introducing solid material into the gas flow, c) a discharging device for the cleaning medium.

It is provided according to embodiments of the invention that the apparatus is configured for discharging cleaning medium from the discharging device at an exit speed of 80 m/s or less. According to the invention, this is therefore not a customary blasting device, in which the medium is output from a nozzle at a high exit speed.

A fan or the like is preferably used as a device for generating a gas flow. Every device which is familiar to a person skilled in the art for introducing solid material particles into a gas flow can be used as the mixing device.

The mixing device can be arranged in a region of increased gas flow speed; said region of increased speed can be brought about, for example, by way of the Venturi effect.

For this purpose, a nozzle can be arranged upstream of the mixing device, which nozzle increases the flow speed in the region of the mixing device.

A diffuser can be arranged downstream of the mixing device, by way of which diffuser the flow speed is reduced.

The apparatus according to the invention can have at least one feed device for feeding different solid materials to the mixing device. There can then be at least one storage container; as an alternative, a part flow from a storage container can be comminuted in a comminuting device. There can likewise be two or more feed devices and/or storage containers.

A part flow or the entire flow of the solid material particles can be fed to a comminutor which is arranged in the apparatus according to the invention and can be configured, for example, as a scrambler (for example, for dry ice). Scramblers are familiar to a person skilled in the art and are described, for example, in WO 2008/113497 A1.

According to FIG. 1, a cleaning apparatus according to an embodiment of the invention has a fan 1 which can be configured, for example, as an auxiliary flow compressor. The air flows through a tube 2 to a nozzle 3 which relieves the air flow into a T-piece 4 and increases the flow speed in the process. A feed tube 5 which feeds in dry ice pellets from a diagrammatically shown storage container 6 opens into the T-piece 4. By way of the reduced pressure in the T-piece 4, the pellets are sucked into the gas flow and are mixed in. The T-piece therefore serves as a mixing device. A diffuser 7 is arranged downstream of the T-piece 4, which diffuser 7 again reduces the speed of the gas flow and of the pellets which are entrained by it.

The gas flow with the pellets is fed through a tube 8 to an (optionally present) scrambler 9, in which a part comminution takes place in order to achieve different pellet sizes. As an alternative, the scrambler can also be arranged between the storage container and the T-piece. The cleaning medium comprising the gas flow and the pellets is fed through a tube 10 to the discharging device 11 which is arranged in front of the engine inlet. Said cleaning medium exits from said discharging device 11 substantially parallel to the rotational axis of the engine and is entrained by the gas flow into the engine, in order to develop the desired cleaning action there. The discharging device 11 can have, for example, a circular or polygonal cross section of the exit opening.

The apparatus according to the embodiment of the invention depicted in FIG. 1 can be arranged in a stationary manner in front of the inlet of an engine. It is likewise possible to arrange a plurality of cleaning apparatuses in front of an engine, in order, for example, to mix different solid material particles or solid material particles of different size in the region of the engine inlet. As an alternative, it is possible to arrange the exit opening in front of the engine in a corotating manner, for example by means of a hose connection. In the example which is shown, the fan 1 is arranged upstream of the mixing device 4, but as an alternative can be arranged downstream thereof, for example downstream of the diffuser 7.

Figure 2:
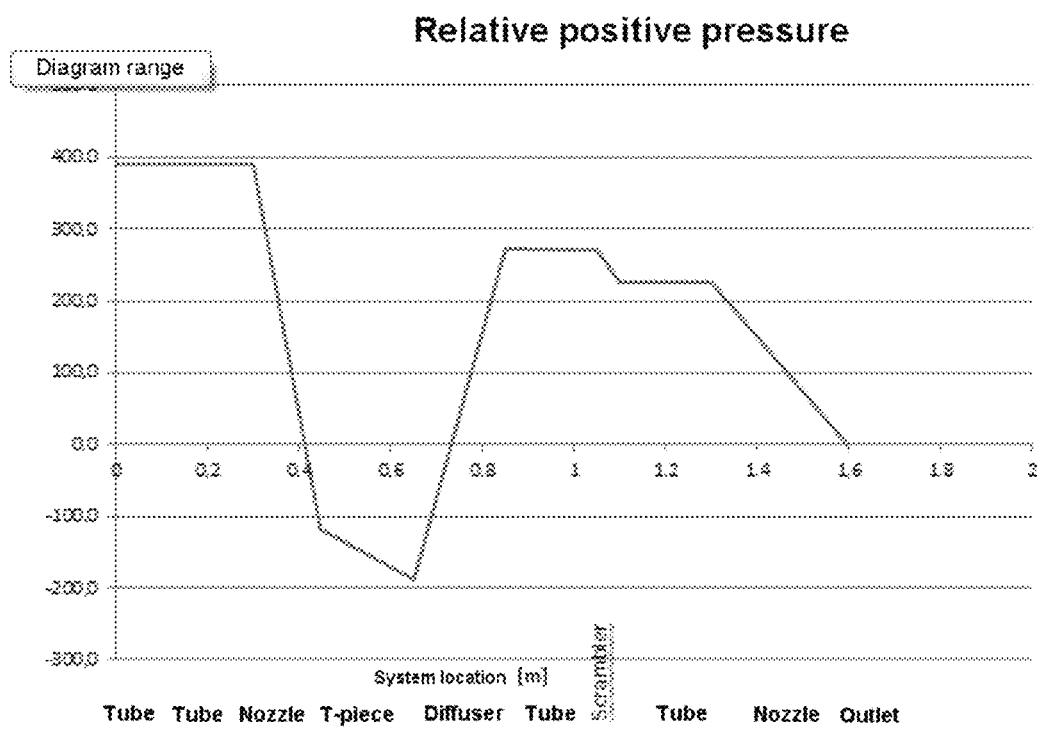
FIG. 2 shows the pressure gradient within the apparatus according to an embodiment of the invention.

FIG. 2 shows the pressure gradient (measured in kPa) in an apparatus according to an embodiment of the invention. The zero point of the pressure scale corresponds to ambient pressure (atmospheric pressure).

In the embodiment which is shown by way of example, the fan 1 first of all generates a positive pressure which drops in the nozzle 3 and the T-piece 4 as far as a slight negative pressure, in order to facilitate the intake of pellets. An increase in the pressure then takes place again in the diffuser 7, and the flow speed of the pellets drops correspondingly to a value according to the invention of below 80 m/s. The pressure then falls as far as the ambient pressure in the region of the exit opening of the discharging device 11.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for cleaning a jet engine, the method comprising:
    introducing a cleaning medium having solid materials into the engine by way of at least one discharging device, wherein the cleaning medium exits from the discharging device at an exit speed of from 5 to 50 m/s
    wherein the cleaning medium is introduced into the jet engine via a cleaning apparatus comprising the at least one discharging device in addition to a fan, a nozzle, a storage chamber a mixing chamber, and a diffuser
    wherein the method further comprises:
        flowing a gas into the mixing chamber via the fan;
        releasing solid materials from the storage chamber into the mixing chamber such that the gas entrains the released solid materials to form the cleaning medium;
        flowing the cleaning medium from the mixing chamber to the diffuser and from the diffuser, to the discharging device;
    wherein the nozzle is upstream of the mixing chamber and the diffuser is downstream of the mixing chamber;
    wherein a pressure of the gas is:
        (i) greater than ambient pressure directly upstream of the nozzle but lesser than ambient pressure directly downstream of the nozzle;
        (ii) lesser than ambient pressure both directly upstream of the mixing chamber and directly downstream of the mixing chamber; and
        (iii) lesser than ambient pressure directly upstream of the diffuser but greater than ambient pressure directly downstream of the diffuser.

2. The method of claim 1,
    wherein the solid materials comprise water ice in the form of pellets or another comminuted form; and
    wherein each of the pellets or each of the solid materials in the another comminuted form are less than 6 mm in size.

3. The method as claimed in claim 1, wherein the exit speed is from 10 to 30 m/s.

4. The method as claimed in claim 2, wherein the size of each of the pellets of the water ice is from 2 mm to 6 mm in length.

5. The method as claimed in claim 1, wherein the cleaning medium is conveyed mechanically to the discharging device.

6. The method as claimed in claim 5, wherein the cleaning medium is conveyed mechanically to the discharging device by a conveying device comprising a spiral conveyor.

7. The method as claimed in claim 1, wherein the cleaning medium is conveyed pneumatically to the discharging device.

8. The method as claimed in claim 1, wherein the jet engine comprises a first compressor stage and an inlet opening, and
    wherein an outlet of the at least one discharging device is arranged at a radial spacing from a rotational axis of the engine, which radial spacing corresponds to from 0.5 to 1.2 times a radius of the inlet opening, which is directed upstream, of the first compressor stage.

9. The method as claimed in claim 1, wherein a main exit direction of the discharging device encloses an angle with a rotational axis of the engine, which angle corresponds substantially to an angle of attack of fan blades of the engine.

10. The method as claimed in claim 1, wherein the solid material includes particles having different sizes.

11. The method as claimed in claim 1, wherein the solid materials comprise carbon dioxide in the form of pellets or another comminuted form.

12. The method as claimed in claim 1, wherein the cleaning medium has solid carbon dioxide and water ice in the mass ratio of from 5:1 to 1:5.

13. The method as claimed in claim 1, wherein the solid materials are introduced with a mass flow of from 500 to 2500 kg/h.

14. The method as claimed in claim 1, wherein the cleaning of the jet engine is carried out over a time period of from 1 to 15 minutes.

15. The method as claimed in claim 1, wherein from 10 to 600 kg of solid material is introduced into the engine during a cleaning operation.

16. The method as claimed in claim 1, wherein the jet engine comprises a fan, which is rotated at a fan rotational speed of from 50 to 500 $min^{-1}$ while the cleaning medium is introduced into the jet engine.

17. The method as claimed in claim 1, wherein the cleaning medium is pneumatically conveyed to the discharging device by way of a carrier gas at a pressure of from 0.5 bar to 2 bar.

18. The method as claimed in claim 1, wherein the cleaning medium is introduced into the jet engine via a cleaning apparatus comprising the at least one discharging device in addition to a fan, a nozzle, a storage chamber, nozzle, a mixing chamber, and a diffuser.

19. The method as claimed in claim 1, wherein the cleaning apparatus comprises a scrambler disposed downstream of the diffuser and the method comprises flowing the cleaning medium through the scrambler to comminute the solid materials.

20. A cleaning apparatus for introducing a cleaning medium into a jet engine, the cleaning apparatus comprising:
   at least one discharging device;
   a fan;
   a nozzle;
   a storage chamber;
   a mixing chamber; and
   a diffuser,
   wherein the at least one discharging device is configured to introduce the cleaning medium having solid materials into the jet engine, wherein the cleaning medium exits from the discharging device at an exit speed of from 5 to 50 m/s,
   wherein the fan is configured to flow a gas into the mixing chamber;
   wherein the mixing chamber is configured to receive the solid materials from the storage chamber such that the gas entrains the received solid materials to form the cleaning medium;
   wherein the diffuser is configured to receive a flow of the cleaning medium from the mixing chamber,
   wherein the discharging device is configured to receive the flow of the cleaning medium from the diffuser,
   wherein the nozzle is upstream of the mixing chamber and the diffuser is downstream of the mixing chamber;
   wherein the cleaning apparatus is configured such that a pressure of the gas is:
      (i) greater than ambient pressure directly upstream of the nozzle but lesser than ambient pressure directly downstream of the nozzle;
      (ii) lesser than ambient pressure both directly upstream of the mixing chamber and directly downstream of the mixing chamber; and
      (iii) lesser than ambient pressure directly upstream of the diffuser but greater than ambient pressure directly downstream of the diffuser.

21. The cleaning apparatus according to claim 20,
   wherein the cleaning medium comprises the solid material, which comprises water ice in the form of pellets or another comminuted form; and
   wherein each of the pellets or each of the solid materials in the another comminuted form are less than 6 mm in size.

22. The cleaning apparatus as claimed in claim 21, wherein the mixing device is arranged in a region of increased gas flow speed.

* * * * *